H. F. COOK & M. J. VEDVIG.
LAWN MOWER SHARPENER.
APPLICATION FILED OCT. 14, 1912.

1,069,392.

Patented Aug. 5, 1913.

Witnesses.
H. L. Opsahl.
A. H. Opsahl.

Inventors:
Herbert F. Cook
Martin J. Vedvig
By their Attorneys,
Williamson & Merchant

UNITED STATES PATENT OFFICE.

HERBERT F. COOK AND MARTIN J. VEDVIG, OF LAKE MILLS, IOWA.

LAWN-MOWER SHARPENER.

1,069,392.  Specification of Letters Patent.  Patented Aug. 5, 1913.

Application filed October 14, 1912. Serial No. 725,695.

*To all whom it may concern:*

Be it known that we, HERBERT F. COOK and MARTIN J. VEDVIG, citizens of the United States, residing at Lake Mills, in the county of Winnebago and State of Iowa, have invented certain new and useful Improvements in Lawn-Mower Sharpeners; and we do hereby declare the following to be a full, clear, and exact description of the invention, such as will enable others skilled in the art to which it appertains to make and use the same.

Our invention has for its object to provide an improved lawn mower sharpener and, to this end, it consists of the novel devices and combinations of devices, hereinafter described and defined in the claims.

The invention is illustrated in the accompanying drawings, wherein like characters indicate like parts throughout the several views.

Figure 1:
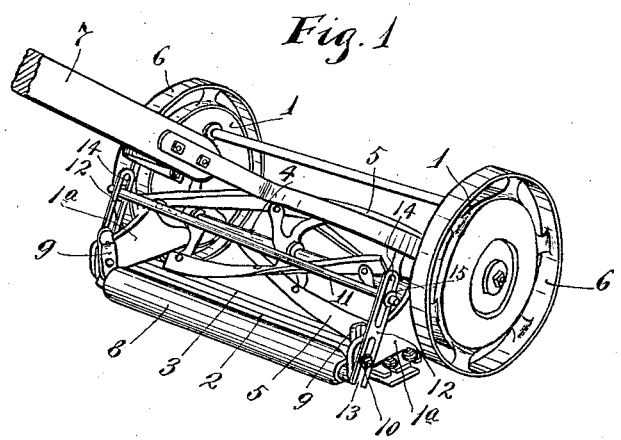
Figure 2:
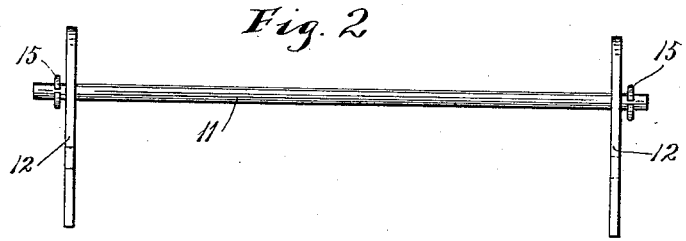
Figure 3:
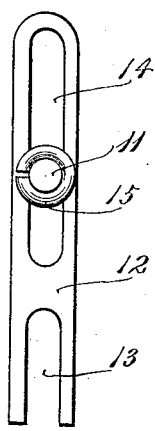
Figure 4:
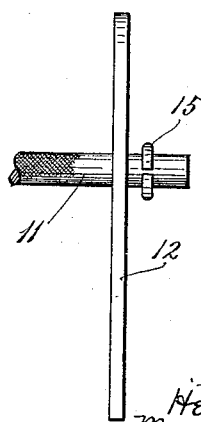

Referring to the drawings, Figure 1 is a perspective view of a lawn mower, having applied thereto in working position the improved sharpener; Fig. 2 is a view in side elevation of the improved sharpener on an enlarged scale, removed from the lawn mower; Fig. 3 is an end elevation of the parts shown in Fig. 2, on an enlarged scale; and Fig. 4 is a side elevation of the parts shown in Fig. 3.

Referring first to the lawn mower, which is shown simply for the purpose of illustrating the improved sharpener in a working position, the numeral 1 indicates the laterally spaced side frames secured together by a flat bar 2, on which is mounted the lower or relatively stationary cutting knife 3. Journaled in the two side frames 1 is a shaft 4, to which the rotary knives 5 are secured, and which shaft is driven from the driving wheel 6 in the customary or any suitable way. Pivotally secured to the side frames 1 is the push or handle bar 7. The ground engaging roller 8 is journaled at its ends in a pair of bearing blocks 9, secured to the rearwardly projecting extensions 1ª of the side frames 1 for vertical adjustments by nut-equipped clamping bolts 10.

All of the above described parts of the lawn mower may be of the standard or of any desired construction.

Referring now to the improved lawn mower sharpener, the same comprises a horizontally extended steel rod 11, as shown, preferably loosely mounted in a pair of supporting brackets 12, that are detachably and adjustably secured in position on the lawn mower by the adjusting bolts 10. These supporting brackets 12 terminate at their lower ends in crotches 13, adapted to straddle the adjusting bolts 10 between their clamping nuts and the outer faces of the side extensions 1ª, and are frictionally held thereby in different horizontal planes and angular positions in respect to the vertical. In their upper end portions, the brackets 12 are provided with longitudinally extended, elongated slots 14, adapted to receive the ends of the sharpening rod 11 and hold said rod with freedom for both rotary and lateral movements and in position extending crosswise of and above the knives 5. In the drawings, the sharpening rod 11 is shown as loosely resting on the knives 5 under its own weight, but in some instances it might be desirable to increase the yielding pressure of the same by means of springs or other additional weights.

For holding the rod 11 against endwise removal from the elongated seats 14, a split clamping ring 15 is placed on each end of the said rod 11, outward of the brackets 12. These split clamping rings 15 also permit the sharpening rod 11 to be adjusted to lawn mowers of different widths.

If desired, the brackets 12 may be provided with open upper ends in order to permit the sharpening rod 11 to be applied to or removed from the brackets 12, by a lateral movement without removing either of the split rings 15.

As best shown in Fig. 4 of the drawings, the surface of the sharpening rod 11 is preferably made corrugated and acts upon the rotary cutting knives 5 in much the same manner as a butcher's steel acts upon a knife. In place of making the sharpening rod 11 corrugated, the same may be made perfectly smooth, but, in this case, the sharpening action is considerably slower. An emery paste may be applied to the smooth sharpening rod to facilitate the sharpening of the knives and, in which case, the rotary knives 5 carry part of the paste to the stationary knife 3, thereby sharpening all of the knives of the lawn mower. Obviously, the sharpening of the knives of the lawn mower by the sharpening rod 11 may take place while the lawn mower is being used in cutting grass, or the cutting knives 5 may be turned by hand a sufficient length of time to properly sharpen the same.

The above described lawn mower sharpener, while extremely simple and of small cost to manufacture, has been found highly efficient for the purpose had in view.

What we claim is:—

1. The combination with a lawn mower, of a rotary sharpening rod, mounted on said lawn mower in a position to engage the rotary knives thereof, substantially as described.

2. The combination with a lawn mower, of a sharpening rod mounted on said lawn mower, in a position to rest upon the rotary knives thereof with freedom for both rotary and lateral movements with respect thereto, substantially as described.

3. The combination with a lawn mower, of a sharpening rod adjustably mounted on said lawn mower in a position to extend crosswise of the rotary knives thereof, to loosely rest thereon with freedom for both rotary and lateral movements with respect thereto, substantially as described.

4. The combination with a lawn mower, of a sharpening rod, and supporting brackets having at their lower ends crotches adapted to straddle the clamping bolts of the ground roller, of said lawn mower, to be adjustably and detachably held thereby, said brackets having at their upper ends elongated open seats adapted to receive and loosely hold the said sharpening rod in a position to extend crosswise of the rotary knives of said lawn mower, to loosely rest thereon with freedom for both rotary and lateral movements with respect thereto, substantially as described.

5. The combination with a lawn mower, of a sharpening rod, supporting brackets having at their lower ends crotches adapted to straddle the clamping bolts of the ground roller, of said lawn mower, to be adjustably and detachably held thereby, said brackets having at their upper ends elongated open seats adapted to receive and loosely hold the said sharpening rod in a position to extend crosswise of the rotary knives of said lawn mower, to loosely rest thereon with freedom for both rotary and lateral movements with respect thereto, and split clamping rings applied to the projecting ends of said sharpening rod, substantially as described.

In testimony whereof we affix our signatures in presence of two witnesses.

HERBERT F. COOK.
MARTIN J. VEDVIG.

Witnesses:
J. B. KEELER,
D. N. HILL.

Copies of this patent may be obtained for five cents each, by addressing the "Commissioner of Patents, Washington, D. C."